United States Patent
Edmonds et al.

(10) Patent No.: US 11,586,039 B2
(45) Date of Patent: Feb. 21, 2023

(54) VEHICLE PROJECTION ASSEMBLY

(71) Applicant: 3M INNOVATIVE PROPERTIES COMPANY, St. Paul, MN (US)

(72) Inventors: William F. Edmonds, Chavannes-des-Bois (CH); Matthew B. Johnson, Woodbury, MN (US); Carl A. Stover, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 670 days.

(21) Appl. No.: 16/558,632

(22) PCT Filed: Mar. 6, 2018

(86) PCT No.: PCT/US2018/021101
§ 371 (c)(1),
(2) Date: Sep. 3, 2019

(87) PCT Pub. No.: WO2018/165126
PCT Pub. Date: Sep. 13, 2018

(65) Prior Publication Data
US 2020/0055400 A1 Feb. 20, 2020

Related U.S. Application Data

(60) Provisional application No. 62/467,722, filed on Mar. 6, 2017.

(51) Int. Cl.
*B60K 35/00* (2006.01)
*H04N 9/31* (2006.01)
*G02B 27/01* (2006.01)

(52) U.S. Cl.
CPC .......... *G02B 27/0101* (2013.01); *B60K 35/00* (2013.01); *H04N 9/3167* (2013.01);
(Continued)

(58) Field of Classification Search
CPC ........................ G02B 27/0101; G02B 27/0172
See application file for complete search history.

(56) References Cited

U.S. PATENT DOCUMENTS 3,610,729 A   10/1971   Rogers
4,446,305 A   5/1984   Rogers
(Continued)

FOREIGN PATENT DOCUMENTS

CN   102177447   11/2013
JP   4114194   4/1992
(Continued)

OTHER PUBLICATIONS

Weber, "Giant Birefringent Optics in Multilayer Polymer Mirrors", Science, Mar. 2000, vol. 287, No. 5462, pp. 2451-2456.
(Continued)

*Primary Examiner* — Nan-Ying Yang
(74) *Attorney, Agent, or Firm* — Clifton F. Richardson

(57) ABSTRACT

Vehicle projection assemblies are described. In particular, vehicle projection assemblies within a housing including a projection module, and selective reflective polarizing element are described. Particular selective reflective polarizing elements may enable advantageous configurations for such vehicle projection assemblies.

13 Claims, 8 Drawing Sheets

(52) U.S. Cl.
CPC .. *B60K 2370/15* (2019.05); *B60K 2370/1529* (2019.05); *B60K 2370/23* (2019.05); *B60K 2370/334* (2019.05)

(56) References Cited

U.S. PATENT DOCUMENTS

| | | |
|---|---|---|
| 4,540,623 A | 9/1985 | Im |
| 5,103,337 A | 4/1992 | Schrenk |
| 5,360,659 A | 11/1994 | Arends |
| 5,448,404 A | 9/1995 | Schrenk |
| 5,882,774 A | 3/1999 | Jonza |
| 6,157,490 A | 12/2000 | Wheatley |
| 6,368,699 B1 | 4/2002 | Gilbert |
| 6,529,250 B1 | 3/2003 | Murakami |
| 6,531,230 B1 | 3/2003 | Weber |
| 6,783,349 B2 | 8/2004 | Neavin |
| 7,497,594 B2 | 3/2009 | Nagarekawa |
| 2002/0166273 A1* | 11/2002 | Nakamura ......... G02B 27/0149 40/593 |
| 2004/0113866 A1 | 6/2004 | Aoki et al. |
| 2007/0279755 A1 | 12/2007 | Hitschmann et al. |
| 2008/0013051 A1 | 1/2008 | Glinski et al. |
| 2016/0178901 A1 | 6/2016 | Ishikawa |
| 2017/0045673 A1* | 2/2017 | Lee .................. G02B 6/0056 |
| 2017/0045737 A1 | 2/2017 | Cammenga |
| 2017/0235030 A1 | 8/2017 | Tanaka et al. |
| 2018/0164585 A1* | 6/2018 | Nambara ............. G02B 27/283 |
| 2018/0180878 A1* | 6/2018 | Yokoe ................. G02B 27/286 |
| 2018/0210201 A1* | 7/2018 | Togasaki .......... G02F 1/133606 |
| 2019/0227308 A1* | 7/2019 | Yokoe .................... G02B 5/282 |
| 2020/0026073 A1* | 1/2020 | Nambara ............... G03B 21/28 |

FOREIGN PATENT DOCUMENTS

| | | |
|---|---|---|
| JP | 4788882 | 7/2011 |
| JP | 2012-58270 | 3/2012 |
| JP | 2015-007763 | 1/2015 |
| WO | WO 1995-017303 | 6/1995 |
| WO | WO 1999-039224 | 4/1999 |
| WO | WO 2008-008646 | 1/2008 |
| WO | WO 2016-208133 | 12/2012 |
| WO | WO 2016-056617 | 4/2016 |

OTHER PUBLICATIONS

International Search report for PCT International Application No. PCT/US2018/021101 dated May 30, 2018, 3 pages.

* cited by examiner

VEHICLE PROJECTION ASSEMBLY

BACKGROUND

Projectors may be located or built into vehicles in order to provide information to a driver or passenger. Head up displays may use projectors to display information visible to a driver or passenger in a forward and upright head position. Projection systems located in vehicles are subject to significant environmental extremes, including solar irradiation and temperature fluctuations.

SUMMARY

In one aspect, the present disclosure relates to a vehicle projection assembly. The vehicle projection assembly includes a non-transmissive housing surrounding a housing cavity, a projection module disposed within the housing cavity having an image throw direction, a transmissive exit aperture disposed within the housing, and a selective reflective polarizing element disposed within the housing cavity and spaced apart from the projection module along the image throw direction. The selective reflective polarizing element is aligned so that at least some light incident on the selective reflective polarizing element along the image throw direction is redirected to a light path that passes through the exit aperture. The selective reflective polarizing element substantially reflects light of one polarization state but substantially transmits light of a second, orthogonal polarization. The selective reflective polarizing element substantially transmits light of both polarizations in the near-infrared spectrum.

DETAILED DESCRIPTION

Figure 1:
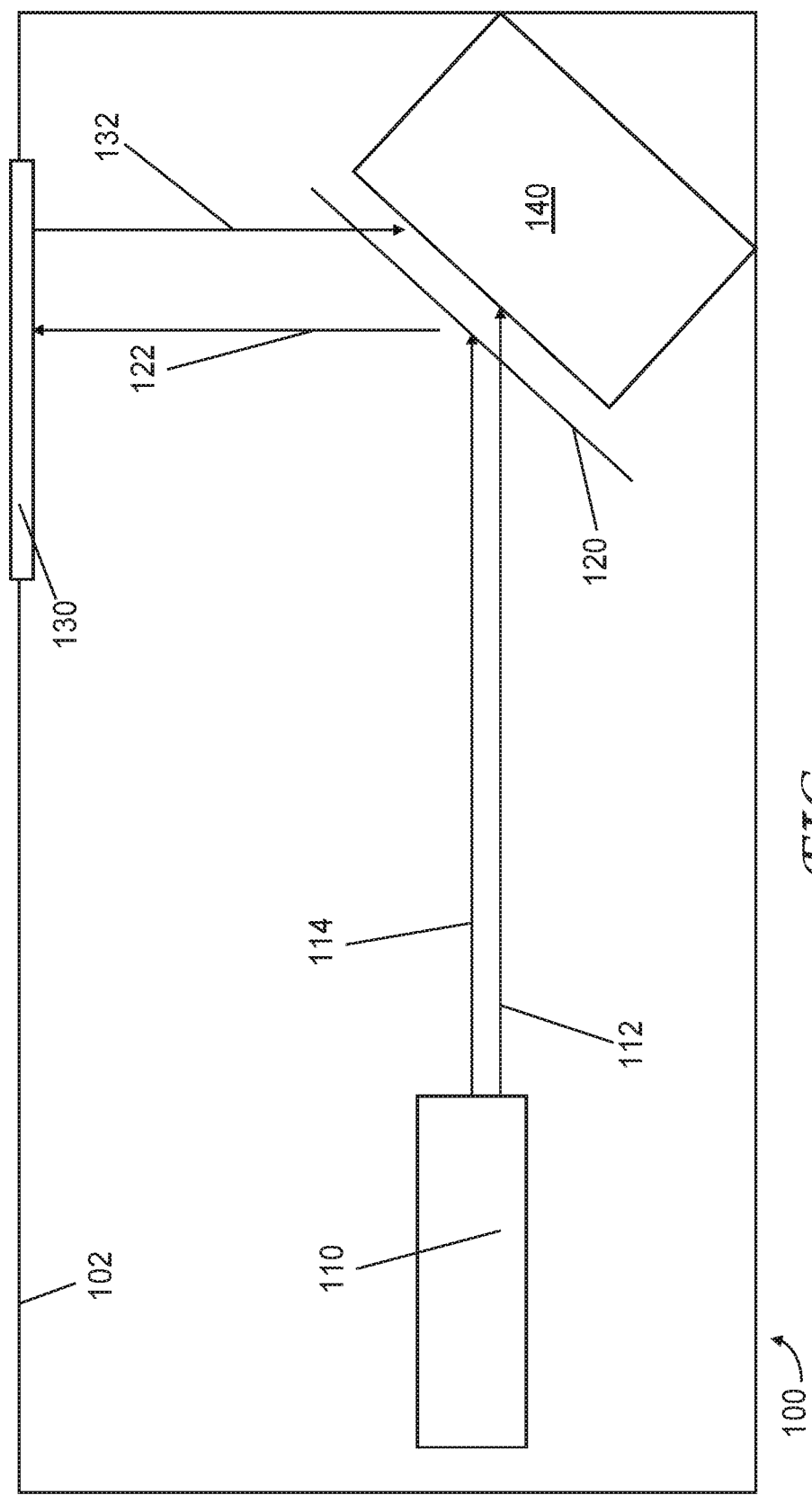
FIG. 1 is a schematic side elevation view of a vehicle projection assembly.

FIG. 1 is a schematic side elevation view of a vehicle projection assembly. Vehicle projection assembly 100 includes housing 102, projection module 110 emitting both pass-polarized light 112 and block-polarized light 114, selective reflective polarizing element 120 reflecting reflected image light 122, exit aperture 130, solar light 132, and light absorbing element 140.

Vehicle projection assembly 100 overall may be any suitable size and shape. In some embodiments, vehicle projection assembly 100 is designed to fit within the dashboard of a car. The vehicle projection assembly may be designed to provide for the efficient integration of the projection assembly with the other components of the vehicle.

In particular, housing 102 may be any suitable three-dimensional shape and size to be provided within the dashboard of a vehicle. In some embodiments, it may be preferable to allow the vehicle projection assembly to be included with a minimum of noticeable features (for example, only the exit aperture being visible to a driver or a passenger). Housing 102 may include ridges, locking features, or other mechanical elements to allow for the installation and perhaps removal and repair of the vehicle projection assembly.

Housing 102 may be formed from any suitable material. In some embodiments, housing 102 is formed from polymeric material. For example, housing 102 may be injection molded. In some embodiments, housing 102 is opaque plastic. In some embodiment, housing 102 is dark colored or other visible light absorptive material. Housing 102 may be chosen for environmental stability; for example, housing 102 may have a high glass transition temperature to withstand extreme environmental conditions present on or inside a vehicle dashboard. Housing 102 may be or include carbon fiber material, lightweighted plastic (e.g., plastic including glass bubbles), or another lightweight material to help the overall vehicle weight and efficiency. In some embodiments, particularly where some or all of housing 102 may be visible to a passenger or driver, housing 102 may include stylistic or aesthetic elements to blend or harmonize the appearance of the housing with adjacent surfaces. For example, housing 102 may include real or synthetic wood, real or synthetic leather, or one or more glossy or matte coatings. In some embodiments, housing 102 may include a camouflage film or other selectively transmissive film.

Projection module 110 may be any suitable projection module capable of projecting image light. For example, projection module 110 may include one or more light sources and a liquid crystal light gating element. In these embodiments, the liquid crystal light gating element may either be transmissive as a traditional LCD projection, or may be reflective as an LCoS (liquid crystal on silicon) projection system.

In some embodiments, projection module 110 may be or include a direct imaging light source, such as an organic light emitting diode (OLED) display. Other projection module and light source types may be used, as appropriate; for example, projectors utilizing digital micromirror devices (DLP projectors) or polarizing beam splitters may be used.

The projection module may include any suitable components and may have any suitable characteristics. For example, the projection module may consume different levels of power and produce a certain level of light intensity depending on the application. The projection module may have any suitable contrast ratio and brightness. The projection module may generate any suitable wavelength or combination of wavelengths or any white point, but at least some of the light from the projector should be within the visible spectrum. For the purposes of this description, the visible spectrum may be considered to be from 400 nm to 720 nm. Components such as power wiring, output lens optics, and, in some embodiments, a cooling fan or fluid circulating heat sink, are not shown for ease of illustration in FIG. 1.

The projection module has an image throw direction, along which image light is projected. In the illustration of FIG. 1, both pass-polarized light 112 and block-polarized light 114 travel along the image throw direction. In some embodiments, as illustrated, the projection module generates light of two orthogonal polarizations (or unpolarized light, which overall will contain a randomized mix of polarizations including approximately equal components of each orthogonal polarization). In some embodiments, these are orthogonal linear polarization states. In some embodiments, these are left- and right-handed circular polarizations. In some embodiments, light of only one polarization may be generated by the projection module. As will become apparent after considering the entire vehicle projection assembly, in these embodiments at least some of the light should be block-polarized light, as that is the only light that is substantially passed through exit aperture 130.

In the illustration of FIG. 1, both pass-polarized light 112 and block-polarized light 114 are incident on selective reflective polarizing element 120. Selective reflective polarizing element 120 substantially reflects block-polarized light 114 while substantially transmitting pass-polarized light 112. Further, selective reflective polarizing element 120 substantially transmits near-infrared spectrum light (for example, light between 800 nm and 1400 nm, or even 800 nm to 2500 nm) of both polarizations. For the purposes of this description, the near-infrared spectrum may be considered to be from 800 nm to 2500 nm. By substantially reflect and substantially transmits, depending on the application, it may mean that at least 50% of the relevant light experiences such an effect. In some embodiments, at least 70% of the relevant light experiences such an effect. In some embodiments, at least 90% of the relevant light experiences such an effect. In some embodiments, at least 95% or 99% of the relevant light experiences such an effect. The measurements should be performed at 45 degree incidence, averaging over both s- and p-polarized light. In some embodiments, the reflective polarizer is situated so that the pass state light is p-pol and the block state light is s-pol, which may maximize the transmission of the pass-state light for visible and near-infrared wavelengths.

Selective reflective polarizing element 120 may be any suitable material that provides the desired optical performance. For example, selective reflective polarizing element may be or include a wire-grid polarizer or a cholesteric reflective polarizer. In some embodiments, selective reflective polarizing element 120 may include a multilayer optical film or, more specifically a multilayer reflective polarizer. In some embodiments, selective reflective polarizing element 120 may include a multilayer reflective polarizer and a mirror. In some embodiments, the mirror may be a cold mirror (reflecting visible light but transmitting infrared light). In some embodiments, the cold mirror may be a multilayer optical cold mirror. In some embodiments, these portions may be laminated together via an optically clear adhesive or other suitable bonding method or process.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters,* 2nd Ed., Macmillan Publishing Co. (1986) and by A. Thelan, *Design of Optical Interference Filters,* McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers such as hardcoats, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where $j = x, y,$ or $z$ and where the layer designations 1,2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, typically followed by passing the multilayer extrudate through one or more multiplication die, and then stretching or otherwise orienting the extrudate to form a final film. The resulting film is typically composed of hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Selective reflective polarizing element 120 may also include a retardation layer. The retardation layer may be a half-wave retardation layer, a quarter-wave retardation layer, an eighth-wave retardation layer, or a retardation layer having any other retardance for at least a portion of the visible spectrum. In some embodiments, selective reflective polarizing element 120 may include ultraviolet light absorbers. These ultraviolet absorbers may be distributed throughout the microlayers, may be in only certain microlayers, or may be only in certain non-optical skin or protective boundary layers. In some embodiments, selective reflective polarizing element 120 includes hindered amine light stabilizers. In some embodiments, selective reflective polarizing element 120 is at least partially curved.

In some embodiments, it may be important for selective reflective polarizing element 120 to be optically smooth. Especially because the selective reflective polarizing element is reflecting at least some image light, it is important that the surface roughness of the selective reflective polarizing element is not too large to distort or degrade the image quality. Based on visible wavelengths, in some embodiment the average surface roughness (root mean square) of the selective reflective polarizing element is less than 200 nm. In some embodiments, it is less than 100 nm. In some embodiments, it is less than 50 nm or even less than 25 nm. In particular, smoothness values for laminated articles with peak-to-valley (PV) ranges of greater than 250 nm or root mean square (RMS) values of greater than 50 nm or $R_a$ roughness of greater than 40 nm for areal scans of 0.67 mm by 0.50 mm have been found to be objectionable in visual appearance. Accordingly, in some embodiments, the smoothness for laminated articles must have smoothness better than (lower than) 250 nm PV and less than 50 nm RMS and less than 40 nm $R_a$ for acceptable visual quality. In other embodiments, smoothness for laminated articles must have smoothness better than 200 nm PV and less than 35 nm RMS and less than 30 nm $R_a$ for acceptable visual appearance. Smoothness may be managed, for example, through the careful selection of laminating adhesives, pressure, roller types, and other process, handling, and material considerations.

In some embodiments, for similar reasons (i.e., to preserve the fidelity of the reflected image), it may be desirable for the selective reflective polarizing element to have a low haze. In some embodiments, acceptably low haze may be less than 10% haze (as measured by a hazemeter; for example, a HAZE-GARD PLUS hazemeter available from BYK-Gardner, Wesel, Germany). In some embodiments, low haze may mean less than 5% haze, less than 2% haze, or even less than 1% haze. Note that in some embodiments, because the haze for the reflected light is the most important, the relevant haze value may only be for the side of the film facing the projector module.

For pass-polarized light 112, it is substantially transmitted through selective reflective polarizing element 120 and is next incident on light absorbing element 140. Light absorbing element 140 may be a part of or connecting to housing 102. In fact, light absorbing element may be formed simultaneously or of the same material as housing 102. In some embodiments, light absorbing element 140 is a light absorptive material. Light absorbing element 140 should absorb at least light in the near-infrared spectrum. In some embodiments, light absorbing element 140 includes one or more heat sinks or heat spreading layers. In some embodiments, light absorbing element 140 includes an antireflection layer.

For block-polarized light 114, it is substantially reflected onto a light path that passes through exit aperture 130. This is represented by reflected image light 122 travelling through exit aperture 130 from selective reflective polarizing element 120. Note that in this illustration, selective reflective polarizing element 120 is disposed at approximately a 45 degree angle with respect to the image throw direction, such that the two portions of the light path from the projection module to the exit aperture are approximately orthogonal. Other designs and geometries are available and will be apparent to the skilled person depending on the design, overall shape, and size of vehicle projection assembly 100. In some embodiments, reflected image light 122 may pass through one or more optical elements after being reflected by selective reflective polarizing element 120. For example, an ultraviolet light absorbing element disposed in a film or other substrate (polymeric, glass, etc.) or a retarder, such as a half- or quarter-wave retarder or one having any other retardance may be disposed in the light path from the selective reflective polarizing element and the exit aperture. These optional configurations and elements are not shown in FIG. 1 for simplicity of illustration.

Exit aperture 130 is disposed within housing 102 and may be any suitable substantially transparent aperture. Exit aperture 130 may be formed from a transparent material instead of simply being an air gap to prevent the ingress and accumulation of dust within the vehicle projection assembly. In some embodiments, exit aperture 130 has a transmissivity of greater than 90%, greater than 95%, or even greater than 99%. In some embodiments, Exit aperture 130 has no reflectivity except Fresnel reflectivity due to the change in refractive index media. In some embodiments, exit aperture 130 is a polycarbonate lens. In some embodiments, exit aperture 130 is an acrylic lens. In some embodiments, exit aperture 130 is a cyclic olefin lens.

As a vehicle projection assembly is typically disposed within a vehicle for outdoor travel, exit aperture 130 necessarily in at least some environmental conditions passes some solar light 132. Solar light 132 is a part of the overall solar spectrum but can be particularly damaging to sensitive optical components and electronics. In particular, irradiation by this light may heat components beyond their failure point, degrading, damaging, or even destroying the functionality of the vehicle projection assembly. However, in the presently described vehicle projection assembly, solar light 132 is incident on selective reflective polarizing element 120 and has all its polarizations substantially transmitted. Next, solar light 132 is incident on light absorbing element 140 and is absorbed. Accordingly, very little solar light 132 is incident on the projection module. This can significantly improve heat management within the vehicle projection assembly by keeping the projection module cooler. In some embodiments, solar light 132 transmitted by selective reflective polarizing element 120 is incident on a sensor to detect or manage ambient conditions and provide feedback in the form of, for example, brightness or contrast modification for the projection module or for an unrelated vehicle system, such as climate control.

Another advantage of this configuration is that no reflective film is needed at the exit aperture. A typical solution for heat management of vehicle projector assemblies is to provide a reflective or reflective polarizer film on the exit aperture lens. Because it is difficult to laminate an optical film or provide a reflective coating without introducing optical roughness or defects, the image quality is degraded from passing through the partially transmissive film. Further, because the reflective or reflective polarizer film is partially reflective, light from the environment may be reflected off the exit aperture lens and provide a "veiling glare-" distracting reflecting light on the windshield of the vehicle. Because the configuration described herein allows for the exit aperture to be substantially non-reflective, there is few plausible or practical light paths for environmental light to be reflected back onto the windshield.

Figure 2:
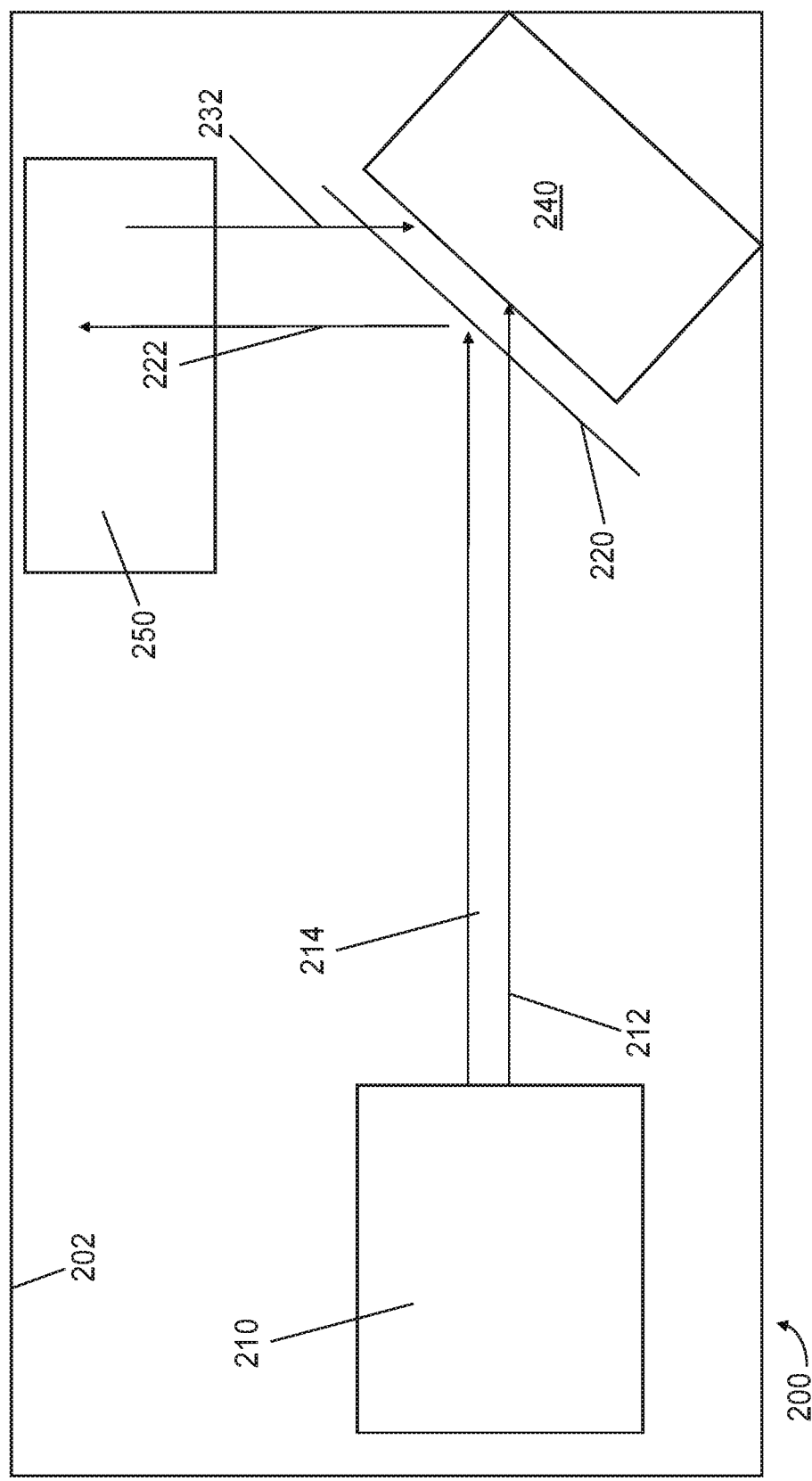
FIG. 2 is a schematic top plan view of a vehicle projection assembly.

FIG. 2 is a schematic top plan view of a vehicle projection assembly. Vehicle projection assembly 200 includes housing 202, projection module 210 emitting both pass-polarized light 212 and block-polarized light 214, selective reflective polarizing element 220 reflecting reflected image light 222, solar light 232, light absorbing element 240, and free form mirror 250.

FIG. 2 is similar to FIG. 1 except FIG. 2 further includes free form mirror 250. Free form mirror 250 may be used in vehicle projection assembly 200 in order to magnify reflected image light 222. Accordingly, free form mirror 250 may be convex, curved or otherwise non-planar. Free form mirror can be or include any suitable reflective surface, including multilayer optical reflectors, vapor coated polymeric or glass mirrors, and polished metal surfaces. In some embodiments, free form mirror 250 may include optical elements such as ultraviolet light absorbers, hindered amine light stabilizers, or retarders. Note in FIG. 2, the optical path upon which block-polarized light 214 is redirected includes two segments; the first incident on free form mirror 250 and the next through the exit aperture, which in the configuration of FIG. 2 may be considered to be directly "above" the free form mirror in the out-of-the-page direction. To reiterate, the specific geometry may be selected and configured based on application and design considerations, which should be possible without significantly different optical performance or functionality.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

EXAMPLES

Commercial Materials:
  (1) Wire Grid Polarizer, commercial example extracted from Nippon Seiki Head Up Display (HUD) (available from Nippon Seiki Co., Ltd., Nagaoka, Japan). This element transmits light from display engine or Picture Generating Unit (PGU).
  (2) Cold Mirror, commercial example extracted from Nippon Seiki HUD (available from Nippon Seiki Co., Ltd., Nagaoka, Japan). This element reflects light from display engine (PGU).
  (3) 3M DBEF-Qv2-PC, available from 3M Company (St. Paul, Minn.). DBEF-Qv2 is reflective polarizer type multilayer film. For HUD application, DBEF-Qv2 is laminated to a polycarbonate (PC) dust cover and could be utilized as part of the exit aperture to function as a half mirror: (1) transmitting polarized light from the LCD-PGU and (2) reflecting a portion of the randomly polarized light. This will be called DBEF-PC.

(4) 3M APF T50, color-neutral reflective polarizing film available from 3M Company (St. Paul, Minn.).

Figure 3:
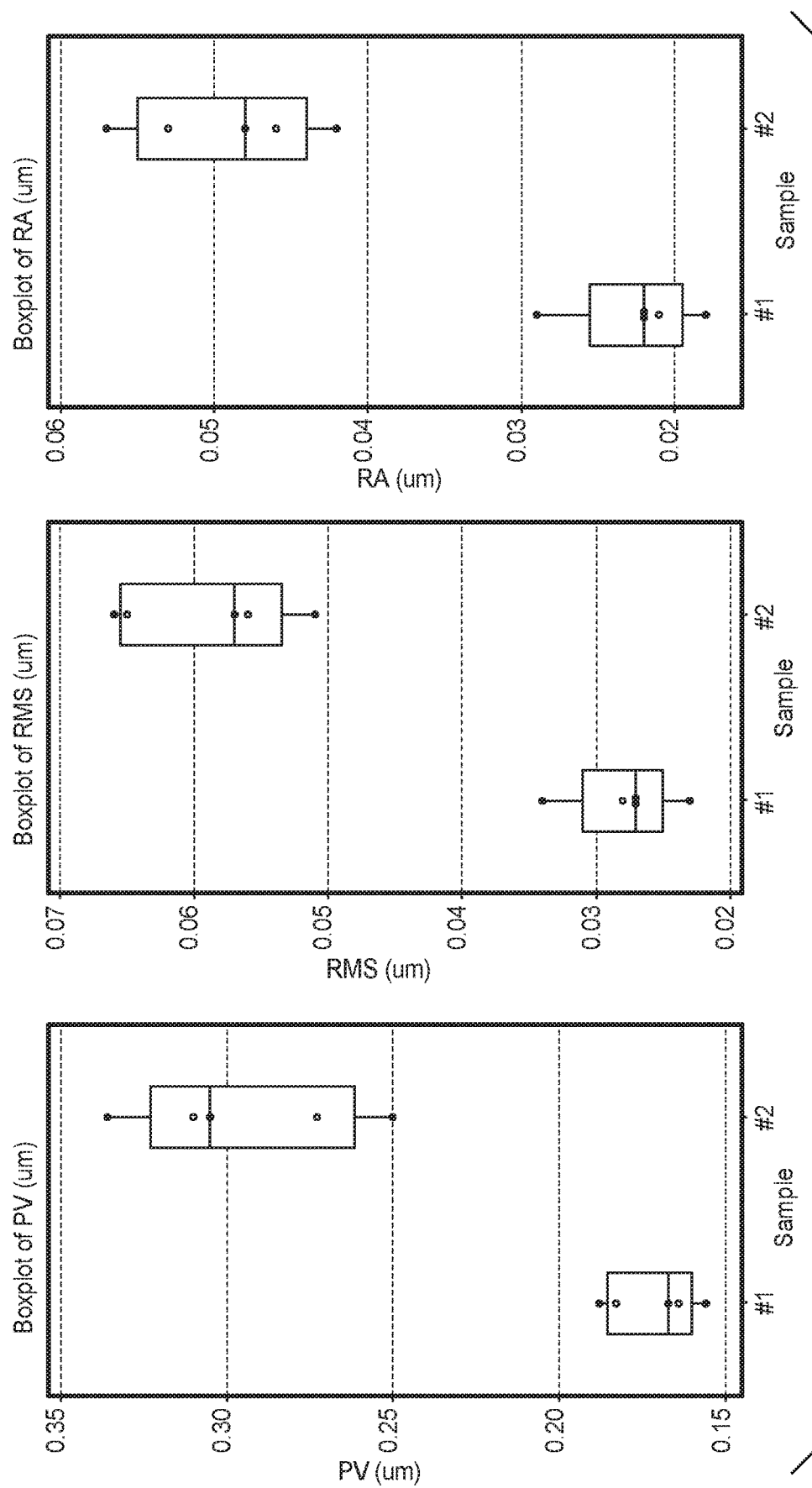
FIG. 3 is a graph showing surface roughness of two laminated samples.

Lamination Smoothness Test Method and Results:

Smoothness for laminated articles was best characterized be measuring from the film side of the glass/film lamination using 5× objective with commercial interferometer system available from Zygo Corporation (Berwyn, Pa.) Scanning the surface in 0.67 mm by 0.50 mm area patches, this instrument allows for standard surface roughness characteristics such as Peak-to-Valley (PV), Root-Mean-Squared (RMS) and $R_a$. These measurements were conducted on samples with visually good and visually poor appearance and statistics illustrated in FIG. 3. The samples labeled #1 were visually good quality after lamination while the samples labeled #2 were visually unacceptable.

Example Comparisons

An ideal heat management system maximizes efficiency of light from the PGU to the viewer while minimizing degrading solar radiation from affecting the PGU.

For thermal management in HUD application, several examples were evaluated:

Comparative Example 1

Figure 4:
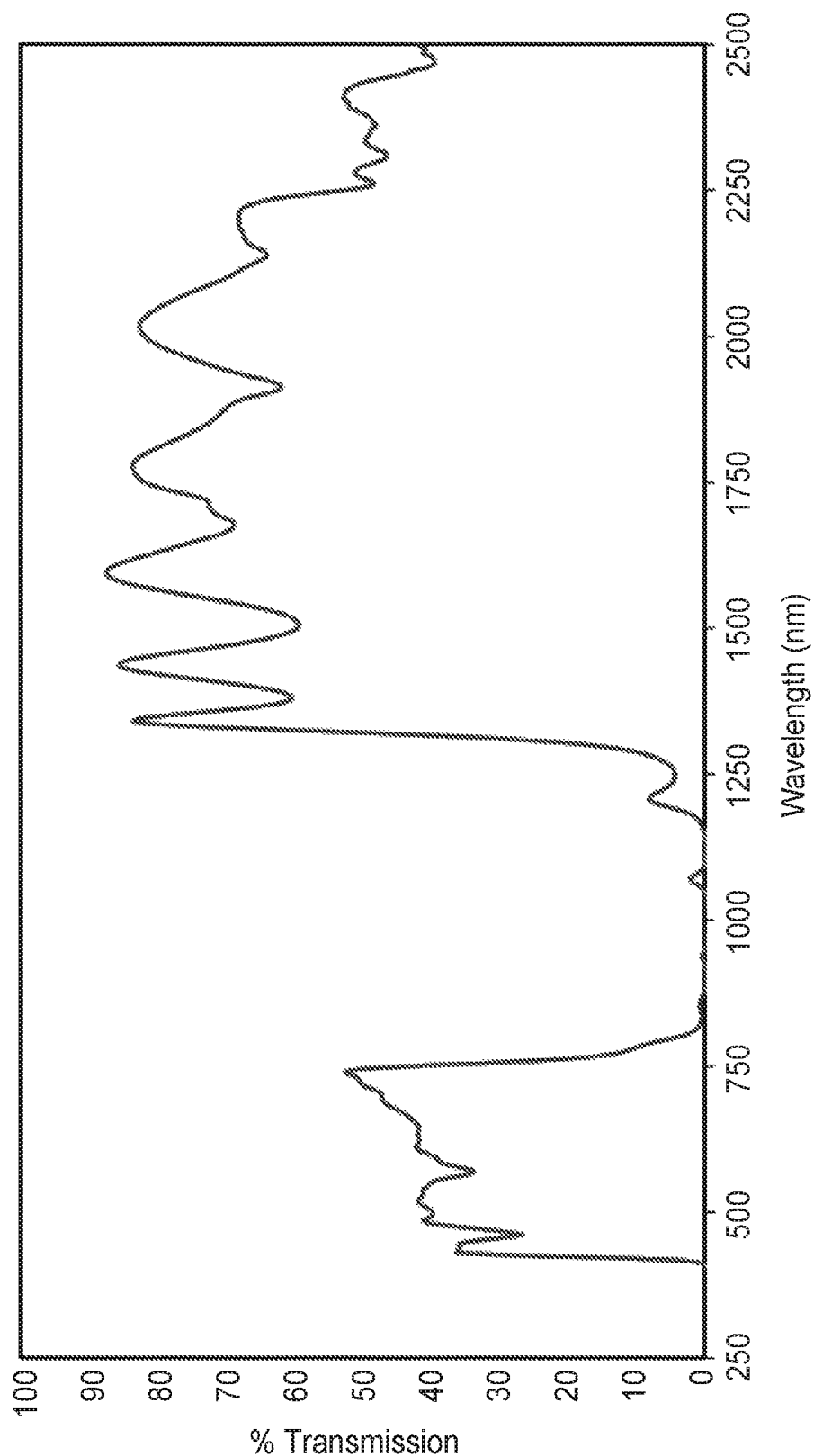
FIG. 4 is a graph showing percent transmission of Comparative Example 1.

Nippon Seiki Wire Grid Polarizer (PGU light transmitted). The transmission spectra for block state light for this example is shown in FIG. 4.

Comparative Example 2

Figure 5:
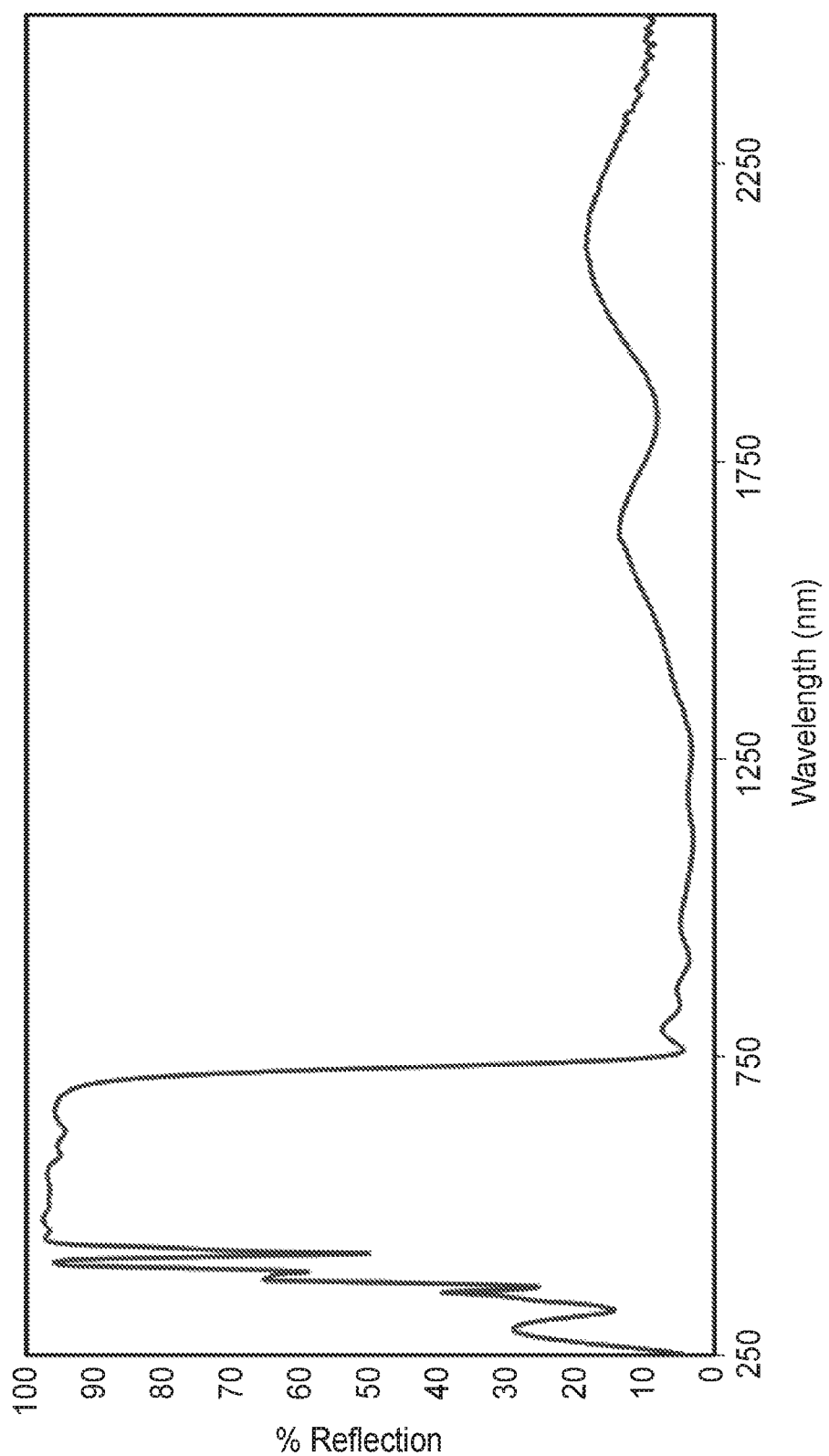
FIG. 5 is a graph showing percent reflection of Comparative Example 2.

Nippon Seiki Cold Mirror (PGU light reflected). The reflection spectra for this example is shown in FIG. 5.

Comparative Example 3

Figure 6:
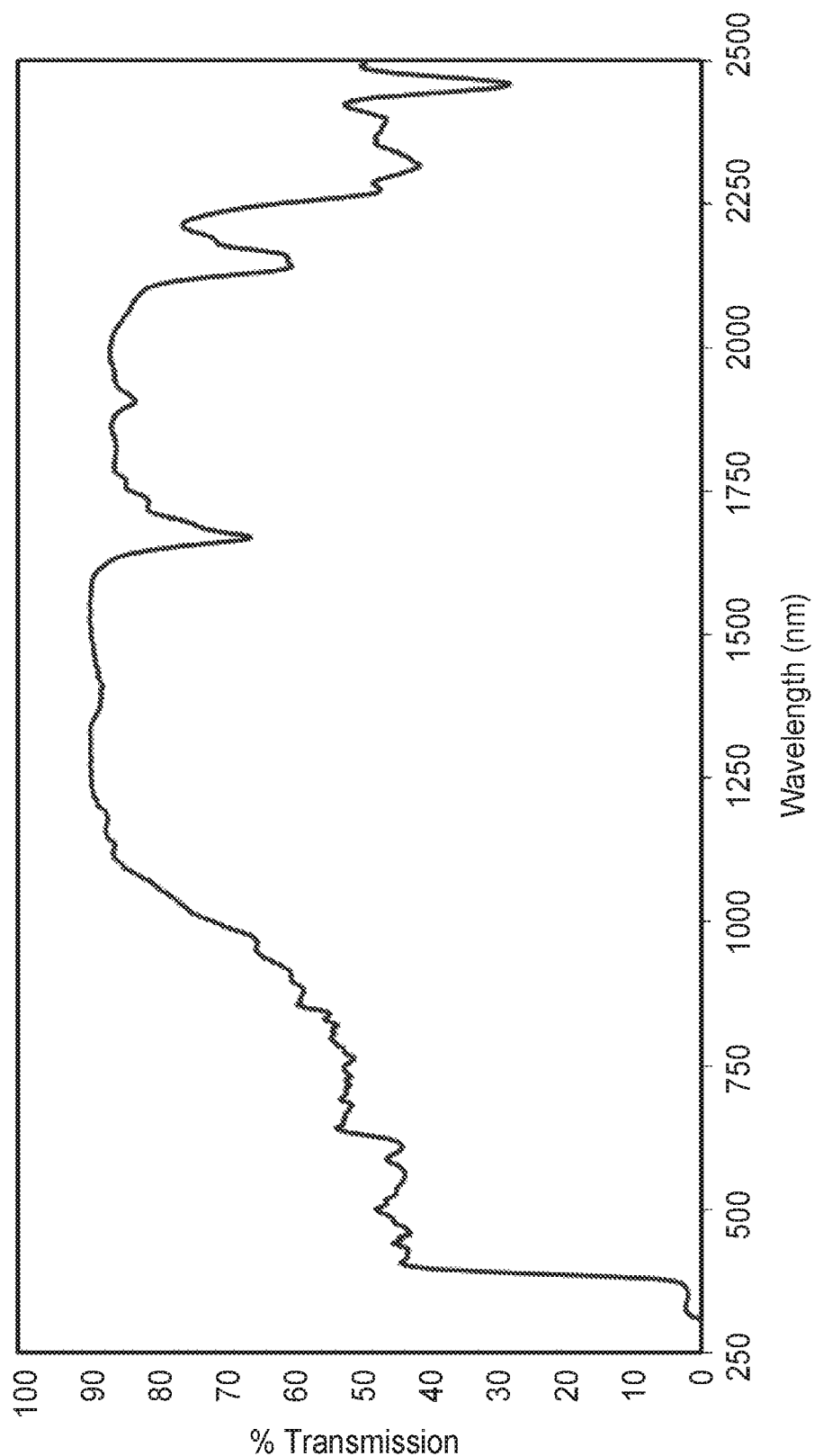
FIG. 6 is a graph showing percent transmission of Comparative Example 3.

3M DBEF-PC (PGU light transmitted). The transmission spectra for this example is shown in FIG. 6.

Example 1

Figure 7:
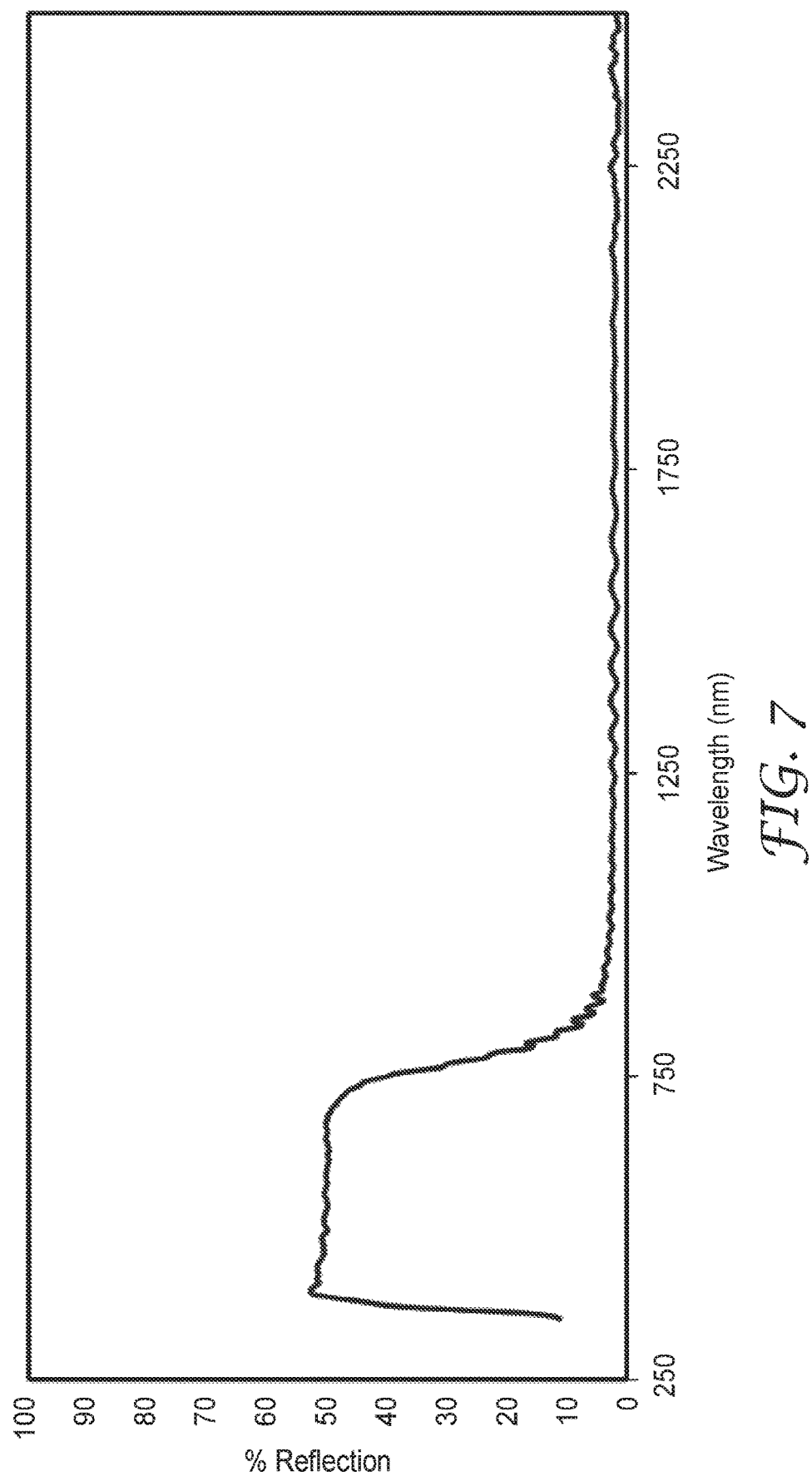
FIG. 7 is a graph showing percent reflection of Example 1.

APF T50 (PGU light reflected). The reflection spectra for this example is shown in FIG. 7. To evaluate the effect on HUD solar heat gain, the solar transmittance onto the PGU was calculated based on ASTM E903-12. Several configurations were evaluated including specific comparative examples and combinations thereof:

(1) Wire Grid Pol
(2) Absorbing Pol Applied to PC cover lens
(3) DBEF-PC
(4) Cold Mirror
(5) Wire Grid+Cold Mirror
(6) Absorbing Pol+Cold Mirror
(7) DBEF PC+Cold Mirror
(8) APF Cold Mirror Example The solar transmittance, which will be proportional to solar heat gain, for each configuration is summarized below:

TABLE 1

Solar Transmittance to PGU determined by ASTM E903-12
Solar Range T/R by ASTM E903-12:
Average, Air Mass 1.5, Direct + Circumsolar

| Sample | % Transmittance to PGU |
|---|---|
| Wire Grid Pol | 28.61 |
| Abs Pol | 59.80 |
| DBEF-PC | 57.57 |
| Cold Mirror | 48.24 |
| Wire Grid Pol + Cold Mirror | 17.95 |
| Abs Pol + Cold Mirror | 19.52 |
| DBEF-PC + Cold Mirror | 22.91 |
| APF Cold Mirror | 28.44 |

In addition to solar transmittance, the transmittance of polarized light from the PGU was determined. The optimized example will have low solar transmittance and relay a high percentage of polarized visible light from the PGU.

TABLE 2

Polarized light transmittance from PGU
Pol Pass Transmission (400-720 nm)

| Sample | % | Reflectance/Transmittance |
|---|---|---|
| Wire Grid Pol | 75.11 | Transmittance |
| DBEF-PC | 88.50 | Transmittance |
| Cold Mirror | 93.47 | Reflectance |
| APF Cold Mirror | 95.97 | Reflectance |

Figure 8:
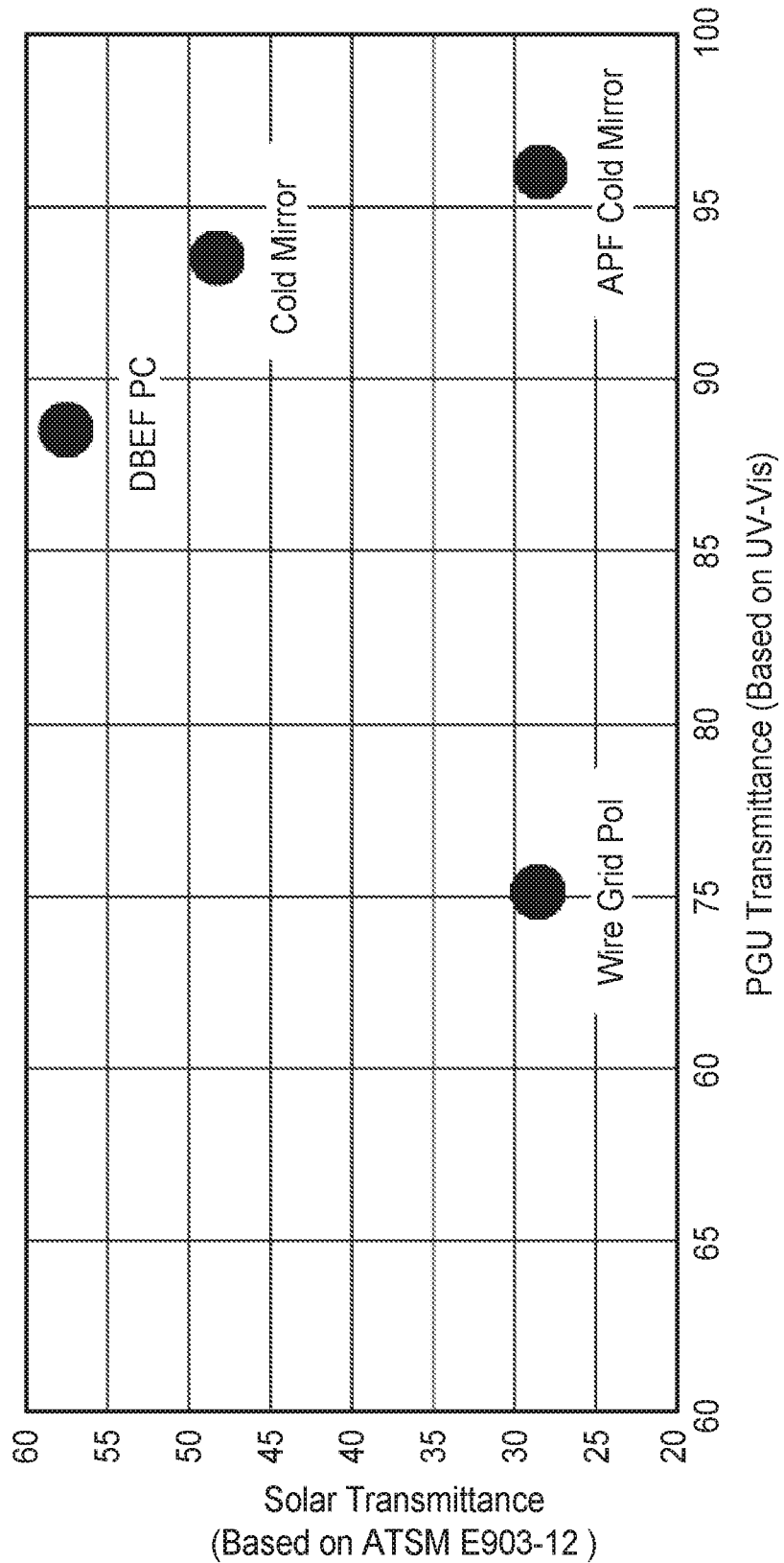
FIG. 8 is a performance comparison of the Comparative Examples and Example.

The final chart, shown in FIG. 8, summarizes the performance of the examples and comparatives. It compares the solar transmittance to the PGU and the transmittance of PGU light to out of the system for Wire Grid Polarizer (CE-1), Cold Mirror (CE-2), DBEF-PC (CE-3), and APF Cold Mirror (Example 1).

The following are exemplary embodiments according to the present disclosure:

Item 1. A vehicle projection assembly, comprising:
  a non-transmissive housing surrounding a housing cavity;
  a projection module disposed within the housing cavity having an image throw direction;
  a transmissive exit aperture disposed within the housing; and
  a selective reflective polarizing element disposed within the housing cavity and spaced apart from the projection module along the image throw direction;
  wherein the selective reflective polarizing element is aligned so that at least some light incident on the selective reflective polarizing element along the image throw direction is redirected to a light path that passes through the exit aperture;
  wherein the selective reflective polarizing element substantially reflects light of one polarization state but substantially transmits of a second, orthogonal polarization; and
  wherein the selective reflective polarizing element substantially transmits light of both polarizations in the near-infrared spectrum.

Item 2. The vehicle projection assembly of item 1, further comprising a light absorbing element disposed within the housing cavity further from the projection module than the selective reflective polarizing element and further from the exit aperture than the selective reflective polarizing element, wherein light transmitted by the selective reflective polarization element is incident on the light absorbing element.

Item 3. The vehicle projection assembly of item 2, wherein the light absorbing element is part of the housing.

Item 4. The vehicle projection assembly of item 1, wherein the selective reflective polarizing element includes a multilayer optical film.

Item 5. The vehicle projection assembly of item 4, wherein the multilayer optical film includes ultraviolet light absorbing elements.

Item 6. The vehicle projection assembly of item 1, wherein the multilayer optical film includes hindered amine light stabilizers.

Item 7. The vehicle projection assembly of item 1, wherein the projection module includes an organic light emitting diode display.

Item 8. The vehicle projection assembly of item 1, wherein the projection module includes a light source and a liquid crystal gating element.

Item 9. The vehicle projection assembly of item 8, wherein the liquid crystal gating element is a liquid crystal on silicon element.

Item 10. The vehicle projection assembly of item 8, wherein the liquid crystal gating element is a liquid crystal panel.

Item 11. The vehicle projection assembly of item 1, wherein the projection module includes a digital micromirror device.

Item 12. The vehicle projection assembly of item 1, wherein the projection module includes at least one polarizing beam splitter.

Item 13. The vehicle projection assembly of item 8, wherein the light source is a polarized light source.

Item 14. The vehicle projection assembly of item 8, wherein the projection module is a polarized projection module, and the image produced by the polarized projection module is predominantly light of the one polarization state reflected by the selective reflective polarizing element.

Item 15. The vehicle projection assembly of item 1, wherein the light path that passes through the exit aperture includes at least two orthogonal components.

Item 16. The vehicle projection assembly of item 1, further comprising a reflector, disposed such that the light path that passes through the exit aperture includes a reflection off a reflector.

Item 17. The vehicle projection assembly of item 16, wherein the reflector is a non-planar reflector.

Item 18. The vehicle projection assembly of item 17, wherein the reflector is a magnifying reflector.

Item 19. The vehicle projection assembly of item 16, wherein the reflector is optically smooth.

Item 20. The vehicle projection assembly of item 1, wherein the selective reflective polarizing element is optically smooth.

Item 21. The vehicle projection assembly of item 1, wherein the selective reflective polarizing element includes a retarder.

Item 22. The vehicle projection assembly of item 21, wherein the selective reflective polarizing element includes a quarter-wave retarder for at least a portion of the visible spectrum.

Item 23. The vehicle projection assembly of item 21, wherein the selective reflective polarizing element includes a quarter-wave retarder for the whole visible spectrum.

Item 24. The vehicle projection assembly of item 21, wherein the selective reflective polarizing element includes an eighth-wave retarder for at least a portion of the visible spectrum.

Item 25. The vehicle projection assembly of item 21, wherein the selective reflective polarizing element includes an eighth-wave retarder for the whole visible spectrum.

Item 26. The vehicle projection assembly of item 21, wherein the selective reflective polarizing element includes a half-wave retarder for at least a portion of the visible spectrum.

Item 27. The vehicle projection assembly of item 21, wherein the selective reflective polarizing element includes a half-wave retarder for the whole visible spectrum.

Item 28. The vehicle projection assembly of item 1, wherein the exit aperture includes a cover lens, and wherein the cover lens has no reflectivity besides Fresnel reflectivity.

Item 29. The vehicle projection assembly of item 1, wherein the cover lens includes a polycarbonate lens.

Item 30. The vehicle projection assembly of item 1, further comprising a ultraviolet light absorbing element disposed along the light path that passes through the exit aperture.

Item 31. The vehicle projection assembly of item 1, wherein the selective reflecting polarizing element includes a wire grid reflective polarizer.

Item 32. The vehicle projection assembly of item 1, wherein the selective reflective polarizing element includes a cholesteric reflective polarizer.

Item 33. The vehicle projection assembly of item 1, wherein the selective reflective polarizing element includes a cold mirror.

Item 34. The vehicle projection assembly of item 1, wherein the selective reflective polarizing element includes a multilayer reflective polarizer and a multilayer cold mirror.

Item 35. The vehicle projection assembly of item 34, wherein the multilayer reflective polarizer and the multilayer cold mirror are laminated with an adhesive.

What is claimed is:

1. A vehicle projection assembly, comprising:
a non-transmissive housing surrounding a housing cavity;
a projection module disposed within the housing cavity having an image throw direction;
a transmissive exit aperture disposed within the housing;
a selective reflective polarizing element disposed within the housing cavity and spaced apart from the projection module along the image throw direction, the selective reflective polarizing element including a multilayer optical film, at least some layers of the multilayer optical film comprising a birefringent polymer; and
a light absorbing element disposed within the housing cavity further from the projection module than the selective reflective polarizing element and further from the exit aperture than the selective reflective polarizing element;
wherein the selective reflective polarizing element is aligned so that at least some light incident on the selective reflective polarizing element along the image throw direction is redirected to a light path that passes through the exit aperture;
wherein the selective reflective polarizing element substantially reflects light of one polarization state but substantially transmits of a second, orthogonal polarization;
wherein the selective reflective polarizing element substantially transmits light of both polarizations in the near-infrared spectrum; and
wherein the exit aperture, the selective reflective polarizing element and the light absorbing element are disposed such that at least an infrared portion of solar light travels along a straight line through the exit aperture and the selective reflective polarizing element to be incident on, and absorbed by, the light absorbing element.

2. The vehicle projection assembly of claim 1, wherein the light absorbing element is part of the housing.

3. The vehicle projection assembly of claim 1, wherein the light path that passes through the exit aperture includes at least two orthogonal components.

4. The vehicle projection assembly of claim 1, further comprising a reflector disposed such that the light path that passes through the exit aperture includes a reflection off the reflector.

5. The vehicle projection assembly of claim 4, wherein the reflector is a non-planar reflector.

6. The vehicle projection assembly of claim 5, wherein the reflector is a magnifying reflector.

7. The vehicle projection assembly of claim 1, wherein the selective reflective polarizing element is optically smooth.

8. The vehicle projection assembly of claim 1, wherein the selective reflective polarizing element includes a retarder.

9. The vehicle projection assembly of claim 1, wherein the exit aperture includes a cover lens, and wherein the cover lens has no reflectivity besides Fresnel reflectivity.

10. The vehicle projection assembly of claim 1, wherein the selective reflecting polarizing element includes a wire grid reflective polarizer.

11. The vehicle projection assembly of claim 1, wherein the selective reflective polarizing element includes a cholesteric reflective polarizer.

12. The vehicle projection assembly of claim 1, wherein the selective reflective polarizing element includes a cold mirror.

13. The vehicle projection assembly of claim 1, wherein the selective reflective polarizing element includes a multilayer reflective polarizer and a multilayer cold mirror.

* * * * *